United States Patent
Li et al.

(10) Patent No.: US 7,262,531 B2
(45) Date of Patent: Aug. 28, 2007

(54) MAGNETIC SUSPENSION BEARING

(76) Inventors: Guokun Li, Suite 102 No. 20, Wangma Lane, Chengguan District, Lanzhou City, Gansu Province 730030 (CN); Xiaopeng Li, Suite 102 No. 20, Wangma Lane, Chengguan District, Lanzhou City, Gansu Province 730030 (CN); Xiaobo Li, Suite 102 No. 20, Wangma Lane, Chengguan District, Lanzhou City, Gansu Province 730030 (CN)

( * ) Notice: Subject to any disclaimer, the term of this patent is extended or adjusted under 35 U.S.C. 154(b) by 198 days.

(21) Appl. No.: 10/415,235

(22) PCT Filed: Oct. 25, 2001

(86) PCT No.: PCT/CN01/01504

§ 371 (c)(1),
(2), (4) Date: Oct. 2, 2003

(87) PCT Pub. No.: WO02/35108

PCT Pub. Date: May 2, 2002

(65) Prior Publication Data

US 2004/0113502 A1 Jun. 17, 2004

(30) Foreign Application Priority Data

Oct. 25, 2000 (CN) .............................. 00 1 30055
Oct. 23, 2001 (CN) .............................. 01 1 36634

(51) Int. Cl.
*H02H 7/09* (2006.01)
(52) U.S. Cl. ...................................... 310/90.5
(58) Field of Classification Search ............... 310/90.5
See application file for complete search history.

(56) References Cited

U.S. PATENT DOCUMENTS

| 5,017,819 | A | * | 5/1991 | Patt et al. | ................... 310/90.5 |
| 5,506,459 | A | * | 4/1996 | Ritts | ........................ 310/90.5 |
| 5,783,886 | A | * | 7/1998 | Hong | ........................ 310/90.5 |
| 6,153,958 | A | * | 11/2000 | Hull et al. | ................. 310/90.5 |

* cited by examiner

*Primary Examiner*—Thanh Lam
(74) *Attorney, Agent, or Firm*—Blakely, Sokoloff, Taylor & Zafman; Stephen M. De Klerk

(57) ABSTRACT

The present invention relates to a magnetic suspension bearing supported by magnetic force, which comprises one or more magnets fixed on a shaft directly or indirectly which can rotate with said shaft, and matching magnets provided in a certain space, wherein the magnetic polarity and magnitude of magnetic force of the matching magnets match with the magnetic polarity and magnitude of magnetic force of said one or more magnets to achieve the full suspension rotation of said shaft, and said magnets and/or matching magnets are permanent magnets. The present invention is of simple design and large power, with many other advantages such as great rigidity and great load-bearing capability and widely use in various fields.

4 Claims, 4 Drawing Sheets

MAGNETIC SUSPENSION BEARING

CROSS-REFERENCE TO OTHER APPLICATIONS

This Application is a National Phase of International Application No. PCT/CN01/01504, filed on Oct. 25, 2001, which claims priority from Chinese Patent Application No. 00130055.5, filed on Oct. 25, 2000 and Chinese Patent Application No. 01136634.6, filed on Oct. 23, 2001.

FIELD OF THE INVENTION

The present invention relates to a bearing, and more particularly to a magnetic suspension bearing supported by magnetic force.

BACKGROUND OF THE INVENTION

There are two kinds of magnetic suspension bearings in the prior art: one is a permanent magnetic suspension bearing and the other is an electromagnetic suspension bearing. In the electromagnetic suspension bearing, the shaft is rotated in suspension corresponding to the bearing with no frictional resistance and higher operation precision by a magnetic force induced by an electromagnetic field. However, the structure of the bearing is very complicated, and it needs an electronic measurement and control system, auxiliary supporting means and other auxiliary means, and accordingly, the manufacture cost is very high, especially for a bearing with a great load-bearing capability. The conventional permanent magnetic suspension bearing is simple in structure and low in manufacture cost, but limited in load-bearing capability and thereby mainly used in instruments such as electromagnetism meters with monopole or two-pole magnetic suspension and thereby a limited rigidity, namely a small dF/dz (the change rate of the load-bearing force when a gap changes), and therefore is not fit for various applications.

OBJECT OF THE INVENTION

The object of the present invention is to provide an all-permanent magnetic full suspension bearing with a simple structure, low manufacture cost, high stability, great rigidity and great load-bearing capability which can be used widely in various fields.

SUMMARY OF THE INVENTION

To achieve the object mentioned above, the present invention provides a bearing which comprises one or more magnets fixed on a shaft directly or indirectly which can rotate with said shaft, and matching magnets provided in certain space, wherein the magnetic polarity and magnitude of magnetic force of said matching magnets match with those of said one or more magnets to achieve the full suspension rotation of said shaft, wherein, said magnets and/or matching magnets are all permanent magnets.

Said magnets and said matching magnets form at least two sets of radial stable magnetic rings and at least one set of axial stable magnetic rings provided between said radial stable magnetic rings, wherein said radial stable magnetic rings comprises a radial static magnetic ring formed by said matching magnets fixed to a bearing housing and a radial movable magnetic ring formed by said magnets which is parallel to the radial static magnetic ring and fixed to a shaft sleeve which extends in radial direction, said radial static magnetic ring and said radial movable magnetic ring both comprise more than two cross magnetic poles which are closely connected in the radial direction, the magnetic poles corresponding to said radial static magnetic ring and said radial movable magnetic ring along the radial direction have the same magnitude of magnetic force with opposite polarities; said axial stable magnetic ring comprises an axial static magnetic ring formed by said matching magnets fixed to a bearing housing and an axial movable magnetic ring formed by said magnets which is parallel to the axial static magnetic ring and fixed to a shaft sleeve which extends in the axial direction, both said axial static magnetic ring and said axial movable magnetic ring comprise more than two cross magnetic poles which are closely connected in the axial direction, the magnetic poles corresponding to said axial static magnetic ring and said axial movable magnetic ring along the axial direction have the same magnitude of magnetic force with opposite polarities.

According to the present invention, said closely connected cross magnetic poles are formed by jointing two or more ring-shaped permanent magnets together, each one of the ring-shaped permanent magnets is a single ring-shaped permanent magnet.

According to the present invention, said closely connected cross magnetic poles are formed by jointing two or more ring-shaped permanent magnets together, each one of the ring-shaped permanent magnets is formed by sticking two or more permanent magnetic blocks together.

According to the present invention, said closely connected cross magnetic poles are formed by way of a multiple-pole magnetizing method.

According to the present invention, said closely connected cross magnetic poles have four magnetic poles.

[According to another aspect of the present invention, it provides a bearing which comprises one or more magnets fixed on the shaft directly or indirectly which can rotate with said shaft, and matching magnets provided in a certain space, wherein the magnetic polarity and magnitude of magnetic force of the matching magnets match with the magnetic polarity and magnitude of magnetic force of said one or more magnets to realize the complete magnetic suspension rotation of said shaft.

According to the present invention, said magnets and/or matching magnets are permanent magnets.]

In the present invention, due to the fact that one or more permanent magnets are fixed on the shaft directly or indirectly, and matching permanent magnets are provided in certain space, wherein the magnetic polarity and magnitude of magnetic force of said matching magnets match with those of said one or more magnets, such perfect matching in space makes the rotating shaft with permanent magnet fixed thereon to rotate in full suspension with all-permanent magnet by magnetic force without other kinds of support or repulsion, in other words, full magnetic suspension can be achieved with the perfect combination of permanent magnets solely without a complicated electronic control system, auxiliary supporting means, such as that made of superconductor, and other auxiliary means. Accordingly, the present invention has many advantages such as a simple structure, low manufacture cost, high stability, great rigidity and great load-bearing capacity, and can be used widely in various fields.

According to the present invention, in each one of the radial stable magnetic ring sets, the magnetic poles corresponding to said radial static magnetic ring and said radial movable magnetic ring along the radial direction have the same magnitude of magnetic force with opposite polarities. Similarly, in each one of the axial stable magnetic ring sets, the magnetic poles corresponding to said axial static magnetic ring and said axial movable magnetic ring along the axial direction have the same magnitude of magnetic force with opposite polarities. In this way, pushing and pulling magnetic circuits, i.e. attracting and repelling magnetic circuits, are formed in both the radial direction and the axial direction respectively. Namely, each set of the radial stable magnetic rings and the axial stable magnetic rings are at the lowest energy state when the magnetic poles are in coupling state, and a restoring force will be produced when they are departure from the coupling state. In regard to the axial stable magnetic ring, an axial stablizing force is formed in axial direction so that the shaft will not move in axial direction, but the axial stable magnetic ring could not maintain the shaft stable in radial direction. In regard to the radial stable magnetic ring, because the gravity of the shaft will make the radial movable magnetic ring have a tendency to move downward, the radial static magnetic ring will pull the radial movable magnetic ring upward by a coupling force, and therefore an upward supporting force is formed. Thus, the radial stable magnetic ring makes the shaft stable in radial indirection. However, the radial stable magnetic ring could not make the shaft stable in axial direction. When the alternative axial stable magnetic ring and radial stable magnetic ring cooperate with each other, the shaft can be suspended entirely and meet the requirements of the stability and rigidity by taking into account of other factors, such as gravity. With directly employing the magnetic suspension structure of the present invention, a magnetic suspension bearing with the advantages of simple structure, low manufacture cost, good stability and great rigidity can be manufactured. Since the rigidity is increased with the increase of the number of the magnetic poles, and the number of the poles can be determined according to the requirement of the rigidity, therefore, a magnetic suspension with great rigidity can be manufactured and the present invention can be applied to various fields.

According to the present invention, said magnet as mentioned above is each one of the single ring-shaped permanent magnets which form said cross magnetic poles of the axial movable magnetic ring in the axial stable magnetic ring, or is each one of the single ring permanent magnets which form said cross magnetic poles of the radial movable magnetic ring in the radial stable magnetic ring. Wherein, said magnet is indirectly fixed to the shaft via a bearing housing. Said matching magnet mentioned above is each one of the single ring-shaped permanent magnets which form said cross magnetic poles of the axial static magnetic ring in the axial stable magnetic ring, or is each one of the single ring-shaped permanent magnets which form said cross magnetic poles of the radial static magnetic ring in the radial stable magnetic ring.

The present invention will be further described with the following embodiments accompanying with the drawings.

DETAILED DESCRIPTION OF THE INVENTION

THE FIRST EMBODIMENT

Figure 1:
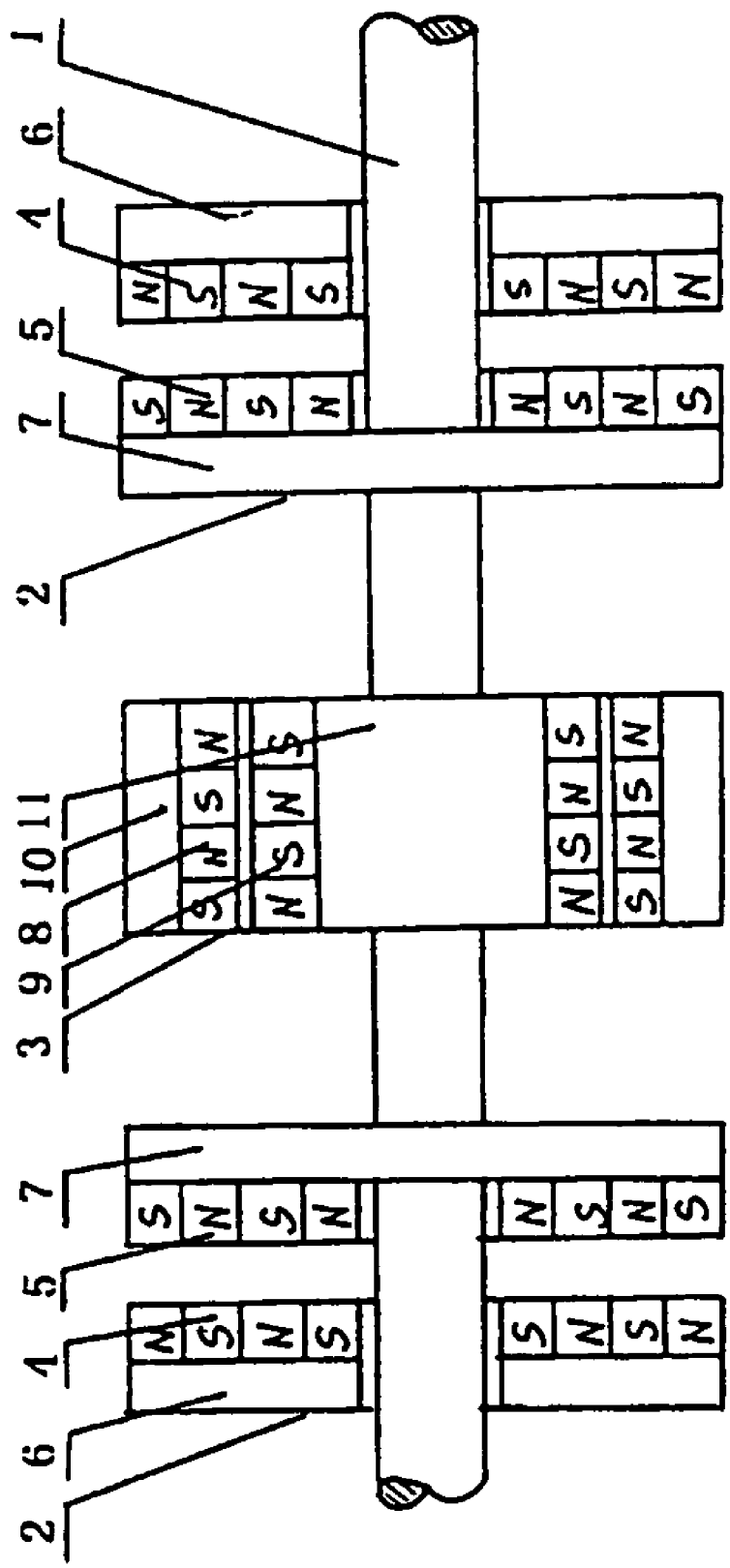
FIG. 1 illustrates the structure in accordance with the first embodiment of the present invention.

As shown in FIG. 1, two sets of radial stable magnetic rings 2 are provided on a supported shaft 1. One set of axial stable magnetic rings 3 is provided between the two sets of radial stable magnetic rings 2. The radial stable magnetic rings 2 comprise a radial static magnetic ring 4 and a radial movable magnetic ring 5, which are parallel to each other. The radial static magnetic ring 4 is fixed on a bearing housing 6. The radial movable magnetic ring 5 is fixed on a shaft sleeve 7 which extends in radial direction. The shaft sleeve 7 is integrated with the shaft 1. Four closely connected cross magnetic poles are alternatively provided in the radial static magnetic ring 4, which are S pole, N pole, S pole and N pole from the shaft along the radial direction respectively. Four closely connected cross magnetic poles are alternatively provided in the radial movable magnetic ring 5, which are N pole, S pole, N pole and S pole from the shaft along the radial direction respectively. The closely connected cross magnetic poles mentioned above can be formed by a single ring-shaped permanent magnet, or by a multiple-pole magnet formed by the way of a multiple-pole magnetizing method. Since it is difficult to manufacture a larger magnetic ring, the closely connected cross magnetic poles mentioned above can be formed by sticking a plurality of magnetic blocks together to achieve the magnetic suspension at a larger level. When the shaft 1 rotates, the shaft sleeve 7 rotates the radial movable magnetic ring 5 fixed thereon. Because the bearing housing 6 is stationary, the radial static magnetic ring 4 fixed on the bearing housing 6 is also stationary. Because the polarity of the magnetic pole corresponding to the radial static magnetic ring 4 is opposite to the polarity of the magnetic pole corresponding to the radial movable magnetic ring 5 but they have the same magnitude of magnetic force, when they are in coupling state, the energy state is at the lowest. When the gravity of the shaft makes the shaft 1 and the radial movable magnetic ring 5 departure downwards from the coupling state, the radial static magnetic ring 4 makes the shaft 1 and the radial movable magnetic ring 5 return to the coupling position where the energy state is at the lowest by a restoring force of multiple-pole magnetic force so that the magnetic energy is at the lowest, namely it is stable in the radial direction.

The axial stable magnetic ring 3 comprises an axial static magnetic ring 8 and an axial movable magnetic ring 9, which are parallel to each other. The axial static magnetic ring 8 is fixed on an axial bearing housing 10. Both the bearing housing 6 and axial bearing housing 10 are fixed in a base. The axial movable magnetic ring 9 is fixed on an axial shaft sleeve 11 which extends in the axial direction. The axial shaft sleeve 11 is integrated with the shaft 1. Four closely connected cross magnetic poles are alternatively provided in the axial static magnetic ring 8, which are N pole, S pole, N pole and S pole from right to left in the axial direction respectively. Four closely connected cross magnetic poles are alternatively provided in the axial movable magnetic ring 5, which are S pole, N pole, S pole and N pole from right to left along the axial direction respectively. The closely connected cross magnetic poles mentioned above can be formed by the combination of single ring-shaped permanent magnets, or by a multiple-pole magnet formed by way of a multiple-pole magnetizing method. Since it is difficult to manufacture a larger magnetic ring, the closely connected cross magnetic poles mentioned above can be formed by sticking a plurality of magnetic blocks together to achieve the magnetic suspension at a larger level. When the shaft 1 rotates, the axial shaft sleeve 11 rotates the axial movable magnetic ring 9 fixed thereon. Because the axial bearing housing 10 is stationary, the axial static magnetic ring 8 fixed on the axial bearing housing 10 is also stationary. Because the polarity of the multiple-pole of the axial static magnetic ring 8 is opposite to the corresponding polarity of the multiple-pole of the axial movable magnetic ring 9 but they have the same magnitude of magnetic force, when they are in coupling state, the energy state is at the lowest, namely it is stable in axial direction.

Magnetic potential energy is defined as the value of energy that is yielded by the relative position change of magnetic field. When the magnets are brought together, like poles repel, i.e. their N-N poles repel or their S-S poles repel, the change of gap between the poles leads to the change of positive magnetic potential energy. Similarly, when the magnets are brought together, opposite poles attract, i.e. their N-S poles attract or their S-N poles attract, the change of gap between the poles leads to the change of negative magnetic potential energy. The two kinds of changes of energy will be limited only in positive range or in the negative range, and the unbalance forces produced thereby are eccentric forces. In other words, radial stable magnetic rings make the shaft unstable in axial direction and axial stable magnetic rings make the shaft unstable in radial direction, and the unbalance forces produced thereby are eccentric forces. When the relative position of corresponding cross magnetic poles changes to same poles facing each other from the position where the opposite poles face each other, that is, from N-S poles to N-N or S-S poles, the change of magnetic potential energy produced thereby is from negative to positive, which is far more than the change only in positive range or in negative range, and thereby restoring force tending to the coupling state is far more than the eccentric force. In conclusion, the restoring force, with which the radial stable magnetic ring makes the shaft stable in radial direction, is far more than the eccentric force, with which the axial stable magnetic ring makes the shaft unstable in radial direction. Similarly, the restoring force, with which the axial stable magnetic ring makes the shaft stable in axial direction, is far more than the eccentric force, with which the radial stable magnetic ring makes the shaft unstable in axial direction. Thus, in this embodiment, when the shaft in suspension is achieved, the restoring forces, which made the shaft back into the state of stable suspension, are far more than the eccentric forces, which made the shaft unstable in axial direction and in radial direction, accordingly, the shaft can be in suspension stably.

Each single ring-shaped permanent magnet in axial stable magnetic ring 3 in FIG. 1 which forms cross magnetic poles of axial movable magnetic ring 9, and each single ring-shaped permanent magnet in radial stable magnetic ring 2 which forms cross magnetic poles of radial movable magnetic ring 5 are both said magnets defined above which are fixed to shaft 1 indirectly via shaft sleeve 7. Said matching magnets, which is fixed on bearing housing 6 and whose polarities are opposite to those of said magnet with certain gap between them, are each of the single ring-shaped permanent magnets in axial stable magnetic ring 3 which forms cross magnetic poles of axial static magnetic ring 8, and each of the single ring-shaped permanent magnets in radial stable magnetic ring 2 which forms cross magnetic poles of radial static magnetic ring 4.

Therefore, the magnetic suspension structure in this embodiment can achieve stability in both axial and radial directions and thereby achieve the object of the present invention.

By calculating the parts to be supported, the two sets of the radial stable magnetic rings 2 and one set of the axial static magnetic rings 3 provided between the two sets of the radial stable magnetic rings in this embodiment can bear the weight in the following range: weight of shaft is 50 kg and the rigidity is 500 kg/mm. Bearings with greater load-bearing capacity and rigidity than those of electromagnetic suspension bearings can be made with the combination of multiple sets.

THE SECOND EMBODIMENT

Figure 2:
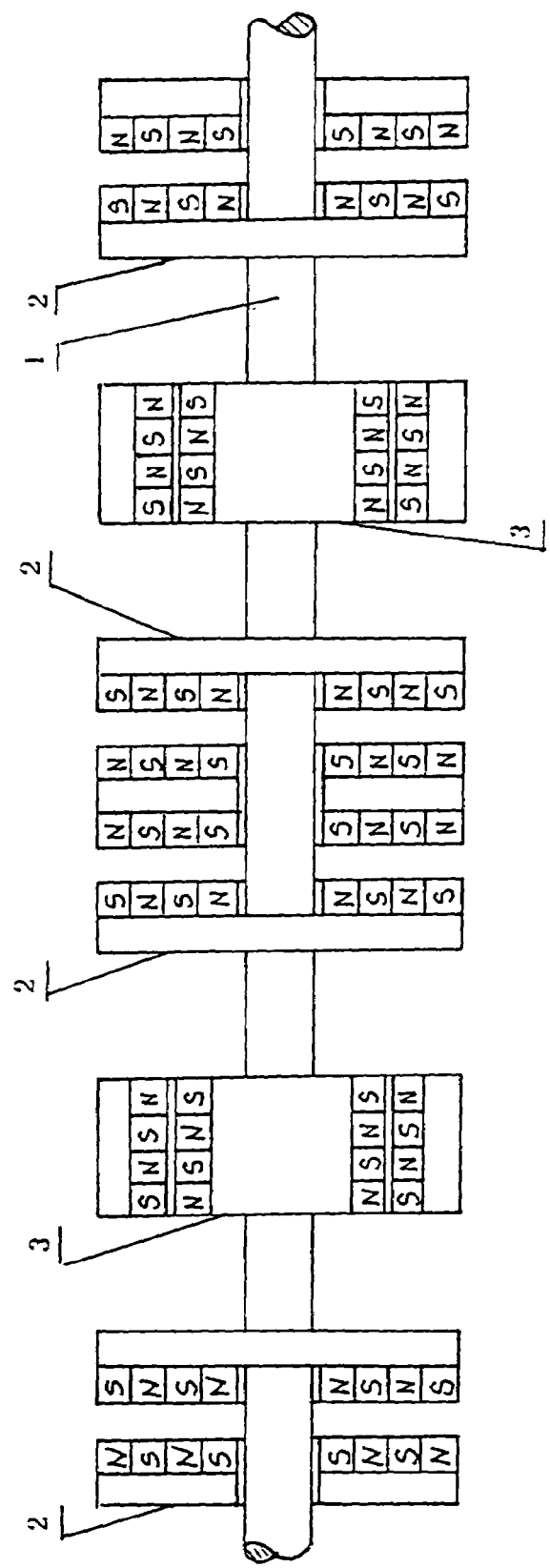
FIG. 2 illustrates the structure in accordance with the second embodiment of the present invention.

In this embodiment, four sets of radial stable magnetic rings 2 and two sets of axial stable magnetic rings 3 are provided with an arrangement as shown in FIG. 2. The two sets of axial stable magnetic rings 3 are provided between the two sets of the radial stable magnetic rings 2, respectively. The radial static magnetic rings 4 of the two central sets of the radial stable magnetic rings 2 are fixed on the two sides of the same bearing housing along radial direction. There are also four cross magnetic poles in this embodiment. Compared with the first embodiment, it can bear bigger rotating shaft and has greater load-bearing capacity and rigidity in this embodiment.

THE THIRD EMBODIMENT

Compared with the first embodiment, the number of the magnetic poles of each the individual radial and axial magnetic ring is increased from 4 to 6. Therefore, the magnetic suspension is more powerful.

THE FOURTH EMBODIMENT

Figure 3:
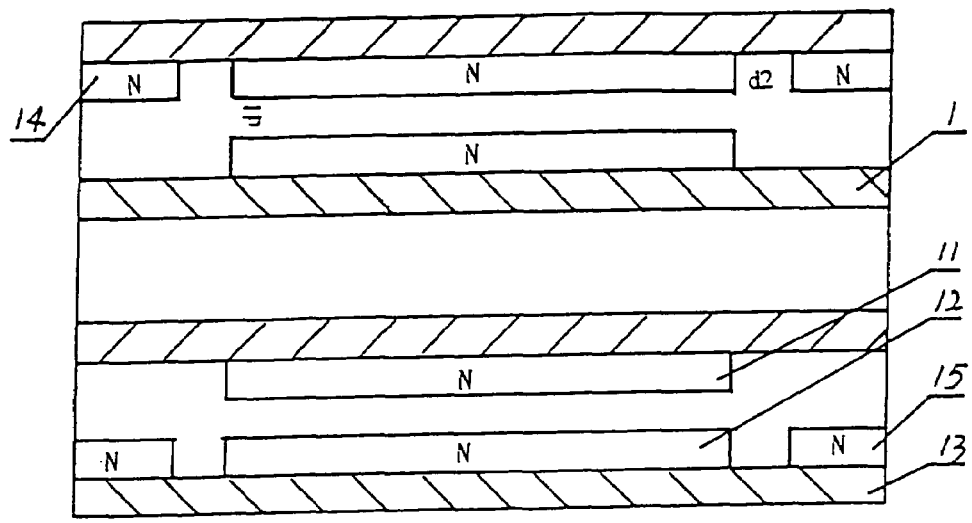
FIG. 3 illustrates the structure in accordance with the fourth embodiment of the present invention.

Referring to FIG. 3, there is only one magnet, that is, an adaxial ring-shaped permanent magnet 11 is fixed to the shaft 1 via magnetizer 13 which is fixed on shaft 1. There are three matching magnets: an abaxial ring-shaped permanent magnet 12 fixed on a ring-shaped magnetizer 13, which has the same polarity and magnitude of magnetic force as the ring-shaped permanent magnet 11, and a left side ring-shaped permanent magnet 14 and a right side ring-shaped permanent magnet 15 provided on each side of said abaxial ring-shaped permanent magnet respectively, which are fixed on said magnetizer 13 and have the same polarity as said abaxial ring-shaped permanent magnet. The ring-shaped magnetizer 13 is coaxial with the shaft 1 but the diameter of the magnetizer 13 is bigger than that of the shaft 1 and thereby a ring-shaped gap is formed between the magnetizer 13 and the shaft 1. In this embodiment, because of the existence of magnetizer 13, though the adaxial ring-shaped permanent magnet 11 and the abaxial ring-shaped permanent magnet 12 have the same polarity and they repel each other, the distance therebetween caused by the repulsion will be at a value of d1 at most. Thus, the shaft 1 is stable in radial direction, but is movable in axial direction. A left side ring-shaped permanent magnet 14 and a right side ring-shaped permanent magnet 15, which have the same polarity, are provided on the magnetizer 13 respectively at a distance d2 from the left side and the right side of the abaxial ring-shaped permanent magnet 12. By calculating the value of the distances d1 and d2 and the magnitude of the magnetic force, the adaxial ring-shaped permanent magnet 11, which tends to move in axial direction, can be made stable. In this embodiment, the external magnetic circuit and an internal magnetic circuit are cylindrical. The repulsion between the central magnet and one matching magnet make the shaft unstable in axial direction and stable in radial direction. Two magnetic circuits are formed between another two matching magnets provided on the two sides and the central matching magnet respectively, when there is a displacement rightwards for shaft 1 the right side magnet produces repulsion, which can be decomposed to leftward thrust pushing shaft 1 leftwards and downward repulsion making the shaft stable in radial direction, and thereby stability in axial direction is achieved. Therefore, a full magnetic suspension can be achieved.

THE FIFTH EMBODIMENT

Figure 4:
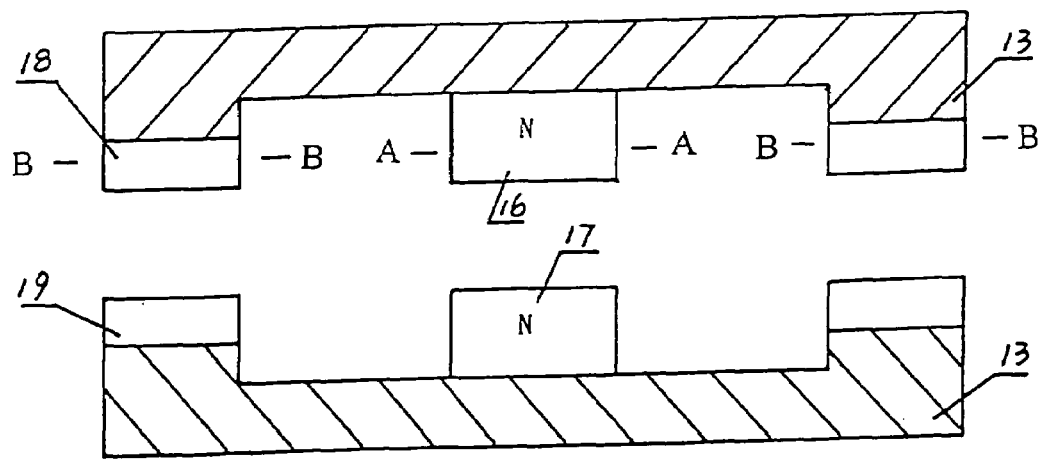
FIG. 4 illustrates the structure in accordance with the fifth embodiment of the invention.
Figure 5:
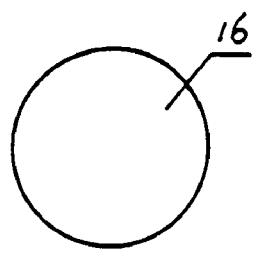
FIG. 5 is a cross-sectional view taken along the middle magnetic poles in FIG. 4.
Figure 6:
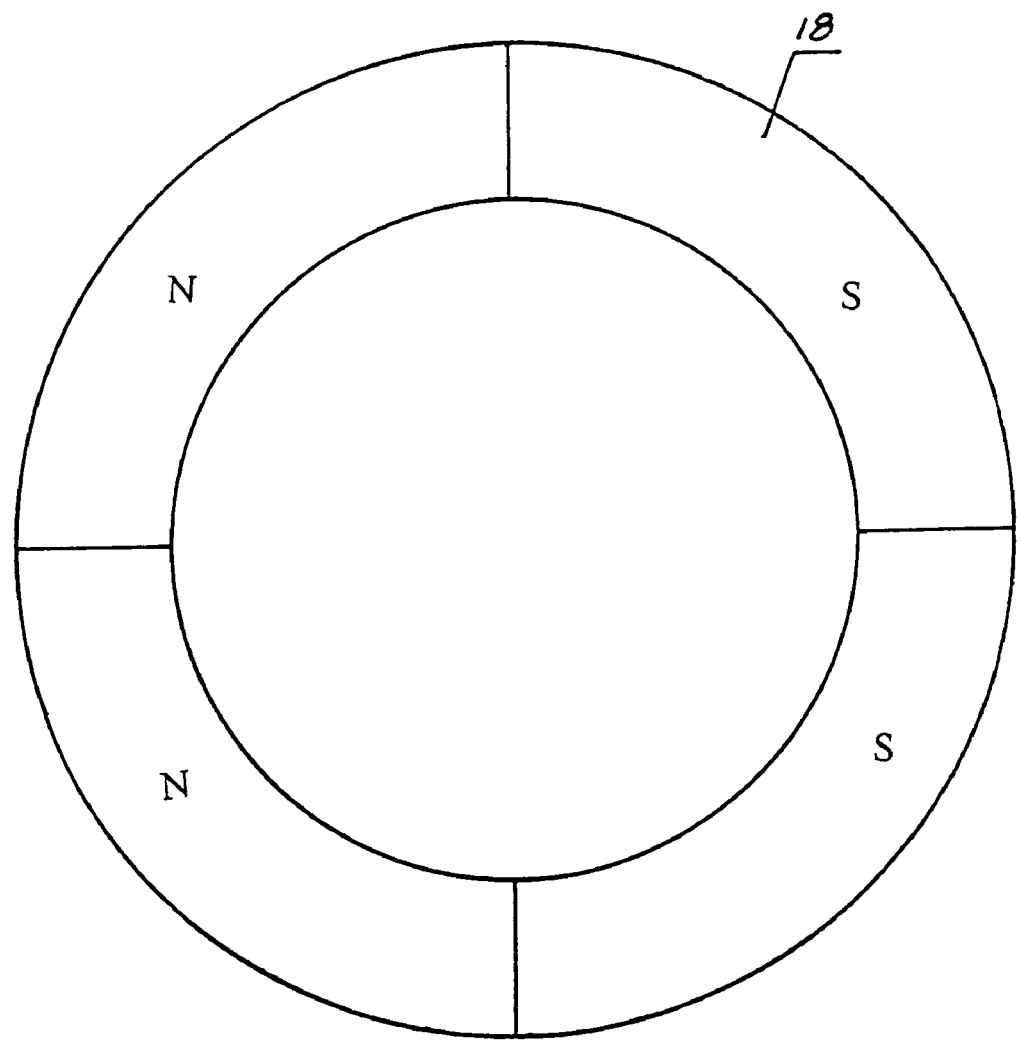
FIG. 6 is a schematic view of the polarity taken from the cross-section B-B in FIG. 5.

Referring to FIGS. 4-6. FIG. 4 is a plane all-permanent magnetic full suspension bearing. In this embodiment, said magnets are two cylindrical magnets 16 and 17 having the same polarity and magnitude of magnetic force which are provided in the centers of the basins of the two circular-basin-shaped magnetizers 13 face to face. As shown in FIG. 5, the cylindrical magnets 16 and 17 form a strong magnetic field in a small span, and therefore a suspension force (i.e. repulsion force) is produced. The matching magnets are two arc magnets which are respectively fixed on the edges of the basins of the two magnetizers 13 and formed into two hollow cylindrical multiple-pole magnets 18 and 19. The corresponding magnetic poles of the two hollow cylindrical multiple-pole magnets 18 and 19 have the same magnitude of magnetic force with opposite directions, as shown in FIG. 6, and the magnetic poles have big span and small magnetic field to form an attractive force and pushing and pulling magnetic circuits in radial and axial directions to keep the circuits stable in axial direction and radial direction and form a plane permanent magnetic full suspension bearing. The shaft in this embodiment is fixed in the central bottom of the two circular-basin-shaped magnetizers 13. In this embodiment, N-poles and S-poles in FIG. 6 can be provided alternately with each other in radial direction in a ring.

INDUSTRIAL APPLICABILITY

The magnetic suspension bearing of the present invention can be applied in various fields where a bearing with high stability, a great rigidity and great load-bearing capability is needed.

The invention claimed is:
1. A magnetic suspension bearing, comprising:
an inner magnetic ring secured to a shaft, the inner magnetic ring including at least one permanent magnet;
an outer magnetic ring around the inner magnetic ring and radially spaced from the inner magnetic ring, the outer magnetic ring including at least one permanent matching magnet, wherein the magnetic polarity and magnitude of magnetic force of the matching magnet of said outer magnetic ring matches with the magnetic polarity and magnitude of magnetic force of said magnet of said inner magnetic ring to achieve the full suspension rotation of said shaft and radial alignment of said shaft with said outer magnetic ring; and
left-side and right-side permanent magnets on left and right sides of the inner and outer magnetic rings, respectively, serving to maintain axial stability of the inner and outer magnetic rings relative to one another, the left-side and right-side permanent magnets having the same polarity as one of the inner magnetic ring or the outer magnetic ring, the one of the inner magnetic ring or the outer magnetic ring being repelled by the left-side and the right-side permanent magnets.
2. The magnetic suspension bearing as claimed in claim 1, characterized in that said inner and outer magnetic rings are ring-shaped permanent magnets.
3. The magnetic suspension bearing as claimed in claim 1, wherein the left-side and right-side permanent magnets are ring-shaped.
4. The magnetic suspension bearing as claimed in claim 1, further comprising a magnetizer, the outer magnetic ring and left-side and right-side permanent magnets being located on the magnetizer.

* * * * *